United States Patent
Kousha et al.

(10) Patent No.: US 12,530,337 B2
(45) Date of Patent: *Jan. 20, 2026

(54) COMPUTER-BASED SYSTEMS CONFIGURED FOR AUTOMATICALLY UPDATING A DATABASE BASED ON AN INITIATION OF A DYNAMIC MACHINE-LEARNING VERIFICATION AND METHODS OF USE THEREOF

(71) Applicant: Capital One Services, LLC, McLean, VA (US)

(72) Inventors: Shabnam Kousha, Washington, DC (US); Joshua Edwards, Philadelphia, PA (US); Lin Ni Lisa Cheng, Great Neck, NY (US); Tyler Maiman, Melville, NY (US); Asher Smith-Rose, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,023

(22) Filed: Mar. 4, 2024

(65) Prior Publication Data

US 2024/0241876 A1 Jul. 18, 2024

Related U.S. Application Data

(63) Continuation of application No. 17/946,926, filed on Sep. 16, 2022, now Pat. No. 11,921,692.

(51) Int. Cl.
*G06F 16/23* (2019.01)
*G06F 16/2455* (2019.01)

(52) U.S. Cl.
CPC .......... *G06F 16/23* (2019.01); *G06F 16/2455* (2019.01)

(58) Field of Classification Search
CPC ..... G06F 16/23; G06F 16/2455; H04M 3/436
USPC .................................................. 707/702, 822
See application file for complete search history.

(56) References Cited

U.S. PATENT DOCUMENTS

| | | | |
|---|---|---|---|
| 9,135,559 B1* | 9/2015 | Chan | G06F 16/2455 |
| 10,223,417 B1* | 3/2019 | Sirin | G06F 16/9024 |
| 10,305,828 B2* | 5/2019 | Cao | G06F 16/9538 |
| 10,951,756 B1* | 3/2021 | Silverstein | H04M 3/436 |
| 11,100,531 B2* | 8/2021 | Sussman | H04L 67/535 |
| 11,176,481 B2* | 11/2021 | Grehant | G06N 20/00 |

(Continued)

*Primary Examiner* — Hanh B Thai
(74) *Attorney, Agent, or Firm* — Greenberg Traurig, LLP

(57) ABSTRACT

In some embodiments, the present disclosure provides an exemplary method that may include steps of receiving input data from at least one external data aggregator; utilizing a trained machine learning algorithm to generate a database of known queries; receiving subsequent input data from the at least one external aggregator; automatically updating the database of known queries associated with the plurality of users; utilizing the trained machine learning algorithm to perform a cross-reference analysis to determine a presence of a data record within the database of known queries; dynamically removing the data record from the database of known queries; utilizing the trained machine learning algorithm to predict a trigger associated with the presence of the at least one data record; and instructing a computing device to initiate a verification of the presence of the at least one data record.

21 Claims, 7 Drawing Sheets

(56) References Cited

U.S. PATENT DOCUMENTS

| | | | |
|---|---|---|---|
| 11,431,833 B1* | 8/2022 | Smith-Rose | H04M 1/575 |
| 11,470,194 B2* | 10/2022 | Cornwell | H04M 3/5175 |
| 11,563,813 B1* | 1/2023 | Bhushan | G06F 16/213 |
| 11,630,822 B2* | 4/2023 | Helms | G06F 21/602 |
| | | | 707/769 |
| 11,726,999 B1* | 8/2023 | Vig | G06F 16/258 |
| | | | 707/718 |
| 11,736,610 B2* | 8/2023 | Buckley | G10L 15/26 |
| | | | 379/265.02 |
| 12,244,774 B2* | 3/2025 | Scivicque | H04M 3/436 |
| 2004/0083138 A1* | 4/2004 | Silverbrook | G06K 7/1421 |
| | | | 235/494 |
| 2012/0058507 A1* | 3/2012 | Shamah | G01N 33/5008 |
| | | | 435/32 |
| 2016/0162785 A1 | 6/2016 | Grobman | |
| 2016/0166328 A1* | 6/2016 | De Vries | A61B 90/30 |
| | | | 600/7 |
| 2017/0039483 A1* | 2/2017 | Cheng | G06N 5/04 |
| 2017/0061528 A1* | 3/2017 | Arora | G06F 16/958 |
| 2017/0213257 A1* | 7/2017 | Murugesan | G06Q 30/0275 |
| 2017/0310616 A1* | 10/2017 | Cao | G06F 16/248 |
| 2018/0067984 A1 | 3/2018 | Hornsby et al. | |
| 2018/0314735 A1* | 11/2018 | Liu | G06N 20/10 |
| 2019/0384863 A1* | 12/2019 | Sirin | G06V 10/776 |
| 2020/0183930 A1* | 6/2020 | Das | G06F 16/248 |
| 2020/0265058 A1* | 8/2020 | Maquaire | G06F 16/23 |
| 2020/0334254 A1* | 10/2020 | Arye | G06F 16/2393 |
| 2020/0366671 A1* | 11/2020 | Larson | H04L 9/3231 |
| 2021/0058507 A1* | 2/2021 | Cornwell | H04M 3/5175 |
| 2021/0193320 A1* | 6/2021 | Shukla | G06F 16/27 |
| 2021/0281593 A1* | 9/2021 | Liu | G06F 16/9535 |
| 2021/0327594 A1* | 10/2021 | Shukla | G06N 5/047 |
| 2022/0035943 A1* | 2/2022 | Jones | G06F 16/2457 |
| 2022/0237192 A1* | 7/2022 | Jiang | G06F 16/2455 |
| 2022/0309054 A1* | 9/2022 | Ananthapur Bache | |
| | | | G06N 20/00 |
| 2022/0311828 A1* | 9/2022 | Moir | G06F 40/166 |
| 2023/0054663 A1* | 2/2023 | Wu | G06N 20/00 |
| 2023/0094583 A1* | 3/2023 | Buckley | G06N 3/08 |
| | | | 379/265.02 |
| 2023/0139783 A1* | 5/2023 | Garib | G06N 3/044 |
| | | | 707/769 |
| 2023/0300252 A1* | 9/2023 | Scivicque | H04M 3/58 |
| | | | 379/212.01 |
| 2023/0334045 A1* | 10/2023 | Bergman | G06F 16/285 |
| 2023/0351435 A1* | 11/2023 | Wright | G06N 3/088 |

* cited by examiner

COMPUTER-BASED SYSTEMS CONFIGURED FOR AUTOMATICALLY UPDATING A DATABASE BASED ON AN INITIATION OF A DYNAMIC MACHINE-LEARNING VERIFICATION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured

BACKGROUND OF TECHNOLOGY

Typically, to update a call screen of an incoming call on a computing device, present technology compares phone numbers of the incoming call to a known list of entities' phone numbers. This comparison assists the present technology to display known entities to a user of the computing device. This requirement to update the call screen subsequent to performing a comparison may decrease a level of optimization and efficiency in dynamically updating the call screen of the computing device.

SUMMARY OF DESCRIBED SUBJECT MATTER

In some embodiments, the present disclosure provides an exemplary technically improved computer-based method that includes at least the following steps of receiving, by at least one processor, input data from at least one external data aggregator at a predetermined interval of time associated with a collection of input data, where the input data is telecommunication data; utilizing, by the at least one processor, at least one trained machine learning algorithm to generate a database of known queries associated with a plurality of users based on an analysis of the input data received from the at least one external data aggregator, where the analysis of the input data provides additional information associated with a plurality of indicative markers; receiving, by the at least one processor, subsequent input data from the at least one external aggregator at a later interval of time; automatically updating, by the at least one processor, the database of known queries associated with the plurality of users based on the subsequent input data; utilizing, by the at least one processor, the at least one trained machine learning algorithm to perform a cross-reference analysis to determine a presence of at least one data record within the database of known queries, wherein the at least one data record is at least one data point shared between the input data and the subsequent input data; dynamically removing, by the at least one processor, the at least one data record from the database of known queries based on the cross-reference analysis; utilizing, by the at least one processor, the trained machine learning algorithm to predict a trigger associated with the presence of the at least one data record including the at least one data point, where the at least one trigger is a data correctness confidence value associated with the at least one external data aggregator; and instructing, by at least one processor, at least one graphic user interface (GUI) having at least one programmable GUI element within a computing device to initiate a verification of the presence of the at least one data record, including the at least one data point, based on the plurality of indicative markers.

In some embodiments, the present disclosure provides an exemplary technically improved computer-based system that includes at least the following components of at least one processor configured to execute software instructions that cause the at least one processor to perform steps to: receive, by at least one processor, input data from at least one external data aggregator at a predetermined interval of time associated with a collection of input data, where the input data is telecommunication data; utilize, by the at least one processor, at least one trained machine learning algorithm to generate a database of known queries associated with a plurality of users based on an analysis of the input data received from the at least one external data aggregator, where the analysis of the input data provides additional information associated with a plurality of indicative markers; receive, by the at least one processor, subsequent input data from the at least one external aggregator at a later interval of time; automatically update, by the at least one processor, the database of known queries associated with the plurality of users based on the subsequent input data; utilize, by the at least one processor, the at least one trained machine learning algorithm to perform a cross-reference analysis to determine a presence of at least one data record within the database of known queries, where the at least one data record is at least one data point shared between the input data and the subsequent input data; dynamically remove, by the at least one processor, the at least one data record from the database of known queries based on the cross-reference analysis; utilize, by the at least one processor, the trained machine learning algorithm to predict a trigger associated with the presence of the at least one data record including the at least one data point, where the at least one trigger is a data correctness confidence value associated with the at least one external data aggregator; and instruct, by at least one processor, at least one graphic user interface (GUI) having at least one programmable GUI element within a computing device to initiate a verification of the presence of the at least one data record, comprising the at least one data point, based on the plurality of indicative markers.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
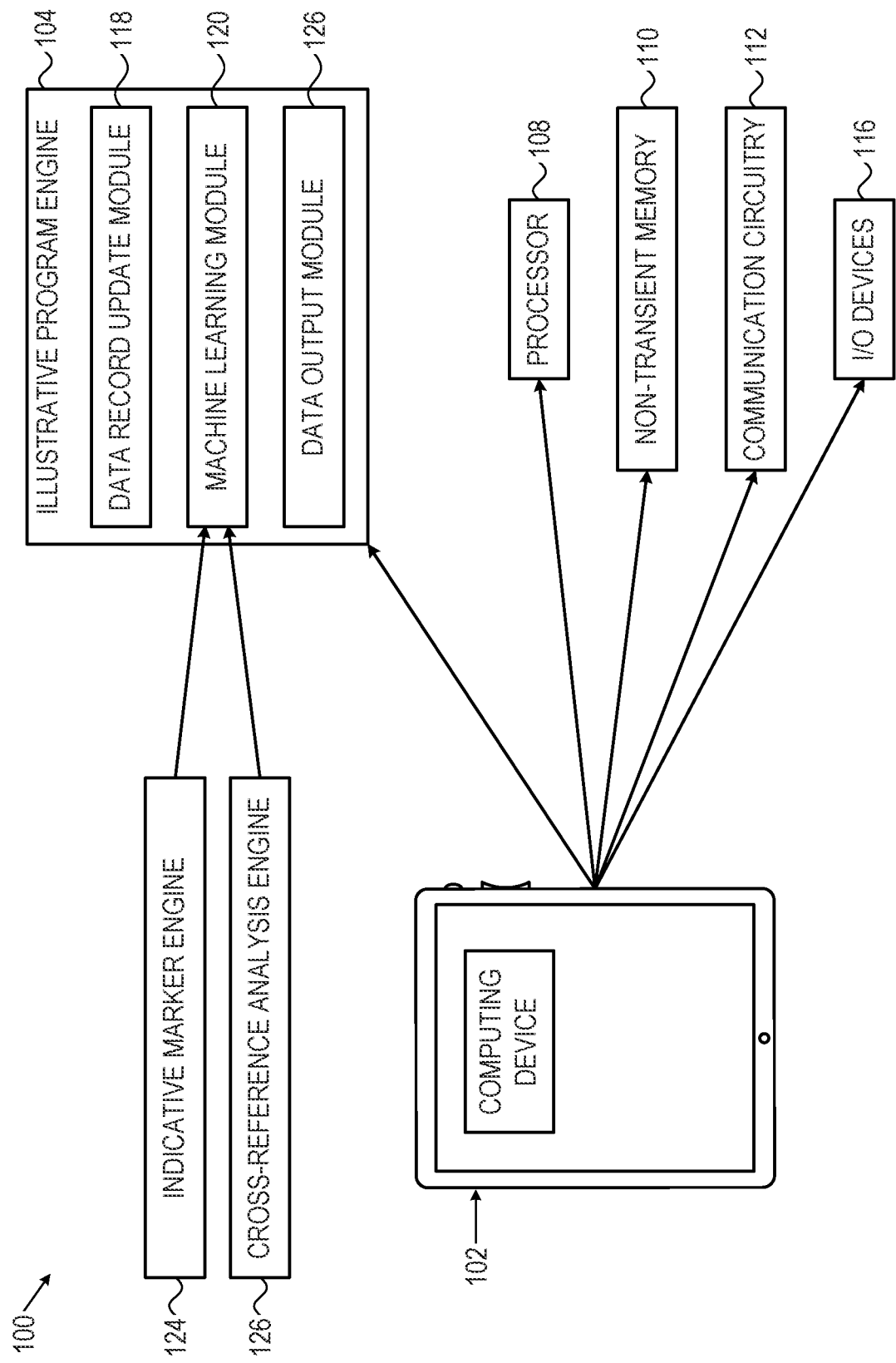
FIG. 1 is a block diagram show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure provide technological solution(s) to a technological computer-centered problem associated with indicating a modification in ownership of a data record associated with a user. The technological computer-centered problem associated with indicating a modification in ownership of a data record associated with the user typically arises due to a delay associated to a first data point at a particular period of time associated with the stored data record that fails to correctly identify the modification to the data record associated with the user and a second data point a subsequent period of time identifies an update to the data record associated with the user. In some embodiments, the present disclosure may utilize a trained machine learning algorithm to dynamically perform a cross-reference analysis that determines a presence of a data record shared between at least two data points and predict a trigger associate with the presence of the data record within a pre-generated database. In some embodiments, the present disclosure may utilize the trained machine learning algorithm to instruct a graphical user interface associated with a computing device to initiate a verification of the presence of the data record based on a plurality of indicative markers. In some instances, the present disclosure may utilize the trained machine learning algorithm to predict a calculated data correctness confidence value associated with at least one external data aggregator to improve efficiency and optimization of indicating the modification in ownership of the data record associated with the user. In some embodiments, the present disclosure provides a computer-centric technological solution that may automatically update the database based on receiving subsequent data from an external data aggregator at a later interval in time. In some instances, the computer-centric technological solution may include dynamically removing the at least one data record from the database based on a utilization of the trained machine learning algorithm to perform the cross-reference analysis performed to determine the presence of a shared data record between at least two data points. In some instances, the computer-centric technological solution may include automatically restoring the data record within the generated database of known queries in response to a successful verification associated with the data point.

FIG. 1 depicts a block diagram of an exemplary computer-based system and platform for performing a cross-reference analysis on at least two data points to determine a presence of at least one shared data record within the database of known queries.

In some embodiments, an illustrative computing system pf the present disclosure 100 may include a computing device 102 associated with a user and an illustrative program engine 104. In some embodiments, the program 104 may be stored on the computing device 102. In some embodiments, the illustrative program engine 104 may reside on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example.

In some embodiments, the illustrative program engine 104 may be configured to instruct the processor 108 to execute one or more software modules such as, without limitations, a data record update module 118, a machine learning module 120, and/or a data output module 122.

In some embodiments, an exemplary data record update module 118, of the present disclosure, utilizes at least one machine learning algorithm described herein, to automatically update a generated database of known queries associated with a plurality of users based on subsequently received data and dynamically perform a cross-reference analysis to determine a presence of at least one shared data recorded within the generated database on known queries. In some embodiments, the exemplary data record update module 118 may dynamically remove the shared data record from the database of known queries based on the cross-reference analysis. Typically, the updating of a generated database associated with specific types of data (i.e. telecommunication data) generates a delay between the moment a data record associated with a user becomes invalid to the moment when the data record associated with the user is updated and verified within a database of known users. In some embodiments, the exemplary data record update module 118 may receive input data from at least one external data aggregator at a predetermined period of time. In some instances, input data may refer to telecommunication data, audio data, visual data, digital data, usage data, and/or other types of transmittible data. In some instances, an external data aggregator may refer to a third-party data aggregator associated with collecting at least one type of data (e.g., without limitation, an on-line computing platform collecting data representative users' activities across numerous electronic places (e.g., websites, apps, etc.)). In some embodiments, the exemplary data record update module 118 may generate a database of known queries associated with a plurality of users based on analysis of the input data received from the at least one external data aggregator. In some instances, the generated database of known queries may refer to a structured query language database. In some instances, the analysis of the input data may provide additional information associated with a plurality of indicative markers. In some instances, the additional information may refer to ownership rights associated with at least one user of the plurality of users. In some instances, at least one indicative marker of the plurality of indicative markers may refer to a session interaction protocol certificate associated with at least one user of the plurality of users. For example, the at least one indicative marker may be at least one of a STIR/SHAKEN certificate, a IP address, and/or a unique identifier associated with the device (e.d., passcode, MSISDN). In some embodiments, the exemplary data record update module 118 may receive subsequent input data from the at least one external aggregator at a later interval of time. In some instances, the subsequent input data may refer to the telecommunication data, audio data, visual data, digital data, usage data, and/or other types of transmittible data at a period of time after that the input data is received. For example, the subsequent input data may be telecommunication data associated with the device at a period of time subsequent to the period of time that the input data was received. In some embodiments, the exemplary data record update module 118 may automatically update the database of known queries associated with the plurality of users based on the subsequent input data. In some embodiments, the exemplary data record update module 118 may perform a cross-reference analysis to determine a presence of at least one data record within the database of known queries. In some instances, the at least one data record may refer to a at least one data point shared between the input data and the subsequent input data. In some instances, the at least one data record may refer to a phone number associated with at least one user in the plurality of users. In some embodiments, the exemplary data record update module 118 may dynamically remove the at least one data record from the database of known queries based on the cross-reference analysis. In some embodiments, the exemplary data record update module 118 may predict a trigger associated with the presence of the at least one data record including the at least one shared data point. In some instances, the trigger may refer to a calculated data correctness confidence value associated with the at least one external data aggregator. In some instances, the trigger may refer to a frequency associated with a rotation of the plurality of indicative markers to at least one different user in the plurality of users. In some instances, the calculated data correctness confidence value may refer to a calculated value associated with each external data aggregator based on a utilization of a trained crowd sourcing algorithm on social media platform data associated with the plurality of users. In some embodiments, the exemplary system may utilize the trained crowd sourcing algorithm to dynamically query a plurality of individuals, receive a plurality of results based on the query, and analyze the received results associated with the queried individuals to generate a baseline confidence value associated with each external data aggregator. In some instances, the exemplary system may survey the plurality of individuals via social media outlets to generate a training dataset that may be used to train the crowd sourcing algorithm, which generates the trained machine learning algorithm. For example, the exemplary system may utilize the trained machine learning algorithm to calculate a crowd score for each telecommunication data aggregator based on a plurality of criteria, such as correctness, timelines, and availability. In this example, the exemplary system generates a scale (i.e, 1-10) for each criterion, and the plurality of users produce a value for each criteria, which the exemplary system then aggregates to generate a baseline based on crowd sourcing. In some embodiments, the exemplary data record update module 118 may predict a predetermined period of time associated with a subsequent update of the database of known queries based on receiving the subsequent input data. In some embodiments, the exemplary data record update module 118 may instruct at least one graphic user interface ("GUI") having at least one programmable GUI element within the computing device 102 to initiate a verification of the presence of the at least one data record. In some instances, the verification of the presence of the at least one data record may refer to a unique identifier associated with at least one user of the plurality of user verification; a call with at least one agent of a call center verification; and/or a login portal verification. In some embodiments, the exemplary data record update module 118 may automatically restore the data record within the generated database of known queries in response to a successful verification associated with the data point.

In some embodiments, the present disclosure describes systems for utilizing at least one machine learning algorithm of a plurality of machine learning algorithms within the machine learning module 120 that may generate a database of known queries associated with a plurality of users based on an analysis of the input data received from the external data aggregator, where the analysis of the input data provides additional information associated with the user by utilizing an indicative marker engine 124. In some embodiments, at least one machine learning algorithm within the machine learning module 120 may be trained utilizing the received input data associated with the external data aggregator to assist in performing the analysis of the input data. In some embodiments, the machine learning module 120 may determine a presence of at least one data record within the database of known queries that shares at least one data point between the input data and the subsequent input data by utilizing a cross-reference analysis engine 126. In some embodiments, the machine learning module 120 may predict the trigger associated with the presence of the at least one data record including the at least one shared data point by utilizing the exemplary date record update module 118. In some embodiments, the machine learning module 120 may automatically update the database of known queries associated with the plurality of users based on the subsequent input data. In some embodiments, the machine learning module 120 may dynamically remove the at least one data record from the database of known queries based on the cross-reference analysis engine 126. In some embodiments, the machine learning module 120 may instruct the at least one GUI within the computing device 102 to initiate the verification of the presence of the at least one data record including the at least one shared data point by utilizing the indicative marker engine 124. In some embodiments, the machine learning module 120 may automatically restore the data record within the generated database of known queries in response to a successful verification associated with the at least one shared data point based on the indicative marker engine 124. In some embodiments, output of the machine learning module 120 may be a generated database of known queries associated with the plurality of users based on the analysis of the input data received from the at least one external data aggregator. In some embodiments, the output of the machine learning module 120 may be a determination of the presence of the at least one data record from the database of known queries. In some embodiments, the output of the machine learning module 120 may be a prediction of the trigger associated with the presence of the at least one data record including the at least one share data point. In some embodiments, the output of the machine learning module 120 may be the automatically restoration of the data record within the generated database of known queries in response to the successful verification associated with the at least one shared data point.

In some embodiments, the data output module 122 may dynamically remove the at least one data record from the database of known queries based on a utilization of the cross-reference analysis engine 126. In some embodiments, the data output module 122 may calculate a data correctness confidence value associated with at least one external data aggregator. In some instances, the calculated data correctness value may refer to a quantified level of confidence and/or trust for each external data aggregator. For example, an external data aggregator with a high level of confidence may have a calculated data correctness confidence value of nine on a scale of one to ten. In some instances, a different external data aggregator with a low level of confidence may have a calculated data correctness confidence value of four on the scale of one to ten. In some embodiments, the data output module 122 may initiate a verification of the presence of the at least one data record including the at least one shared data point based on the utilization of the indicative marker engine 124. In some embodiments, the data output module 122 may automatically restore the data record within the generated database of known queries in response to a successful verification associated with the data point based on the plurality of indicative markers.

In some embodiments, the illustrative program engine 104 may receive input data from at least one external data aggregator at a predetermined interval of time associated with a collection of the input data. In some embodiments, the illustrative program engine 104 may utilize the trained machine learning module 120 to generate a database of known queries associated with a plurality of users based on an analysis of the input data received from the at least one external data aggregator. In some embodiments, the illustrative program engine 104 may receive subsequent input data from the at least one external aggregator at a later interval of time. In some embodiments, the illustrative program engine 104 may automatically update the database of known queries associated with the plurality of users based on the subsequent input data. In some embodiments, the illustrative program engine 104 may perform a cross-reference analysis to determine a presence of at least one data record within the generated database of known queries. In some embodiments, the illustrative program engine 104 may dynamically remove the at least one data record from the database of known queries based on the cross-reference analysis. In some embodiments, the illustrative program engine 104 may predict a trigger associated with the presence of the at least one data record including that at least one shared data point. In some embodiments, the illustrative program engine 104 may initiate a verification of the presence of the at least one data record including the at least one shared data point based on a plurality of indicative markers. In some embodiments, the illustrative program engine 104 may automatically restore the data record within the generated database of known queries in response to a successful verification associated with the data point based on the plurality of indicative markers.

In some embodiments, the non-transient memory 110 may store the generated database of known queries associated with a plurality of users based on the analysis of the input data received from the at least one external data aggregator. In some embodiments, the non-transient memory 110 may store a plurality of automatic updates to the generated database of known queries associated with the plurality of users based on the subsequent input data. In some embodiments, the non-transient memory 110 may store at least one predicted trigger associated with the presence of the at least one data record including the at least one shared data point. In some embodiments, the non-transient memory 110 may store an initiation of a verification of the presence of the at least one data record. In some embodiments, the non-transient memory 110 may store the output of the exemplary date record update module 118. In some embodiments, the non-transient memory 110 may store the output of the trained machine learning module 120. In some embodiments, the non-transient memory 110 may store the output of the data output module 122.

Figure 2:
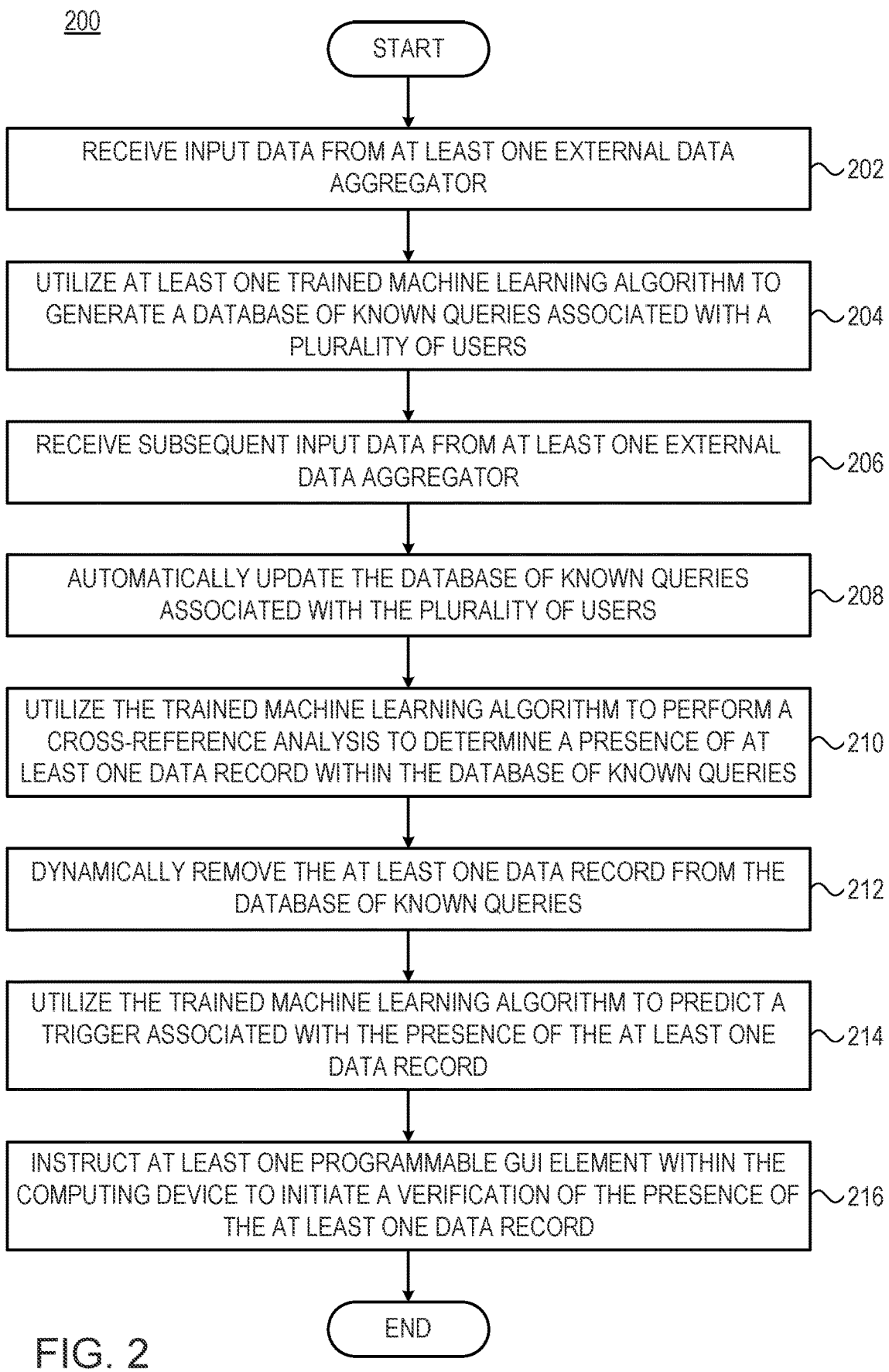
FIG. 2 is a flowchart illustrating operational steps for utilizing a trained machine learning algorithm to predict a trigger associated with the presence of a data record within a generated database, in accordance with one or more embodiments of the present disclosure.

FIG. 2 is a flowchart 200 illustrating operational steps for utilizing a trained machine learning algorithm to predict a trigger associated with the presence of at least one data record, in accordance with one or more embodiments of the present disclosure.

In step 202, the illustrative program engine 104 within the computing device 102 may be programmed to receive input data from at least one external data aggregator at a predetermined interval of time associated with a collection of input data. In some embodiments, the input data may refer to telecommunication data associated with the computing device 102 associated with the at least one user. For example, the input data may refer to a plurality of incoming and outgoing phone calls associated with a specific mobile phone associated with a particular user.

In step 204, the illustrative program engine 104 may be programmed to utilize at least one trained machine learning algorithm to generate a database of known queries associated with a plurality of users. In some embodiments, the illustrative program engine 104 may generate the database of known queries associated with a plurality of users based on an analysis of the input data received from the at least one external data aggregator. In some embodiments, the illustrative program engine 104 may generate the database of known queries associated with a plurality of users based on provided additional information associated with a plurality of indicative markers. In some embodiments, the provided additional information may refer to ownership rights associated with at least one user of the plurality of users. In some embodiments, at least one indicative marker of the plurality of indicative markers may refer to a session interaction protocol certificate associated with at least one user in the plurality of users. For example, the plurality of indicative markers distinguishes at least one computing device 102 from a plurality of computing devices. In some embodiments, the generated database of known queries may refer to a structured query language database.

In step 206, the illustrative program engine 104 may be programmed to receive subsequent input data from the at least one external aggregator. In some embodiments, the illustrative program engine 104 may receive subsequent input data from a third-party telecommunication data aggregator at a later interval of time. In some instances, the later interval of time may refer to a period of time subsequent to the time that the input data is received. For example, this later interval of time may be minutes, hours, days, and/or weeks after the input data is received.

In step 208, the illustrative program engine 104 may be programmed to automatically update the database of known queries associated with the plurality of users. In some embodiments, the illustrative program engine 104 may automatically update the database of known queries associated with the plurality of users by modifying at least one data record in the plurality of data records to reflect the received subsequent input data. In some embodiments, the data record may refer to a phone number associated with at least one user of the plurality of users.

In step 210, the illustrative program engine 104 may be programmed to utilize the at least one trained machine learning algorithm to perform a cross-reference analysis to determine a presence of at least one data record within the database of known queries. In some embodiments, the illustrative program engine 104 may perform a cross-reference analysis to determine the presence of at least one shared data point between the input data and the subsequent input data.

In step 212, the illustrative program engine 104 may be programmed to dynamically remove the at least one data record from the database of known queries. In some embodiments, the illustrative program engine 104 may dynamically remove the at least one data record from the database of known queries based on the cross-reference analysis.

In step 214, the illustrative program engine 104 may be programmed to utilize the trained machine learning algorithm to predict a trigger associated with the presence of the at least one data record including the at least one shared data point. In some embodiments, the illustrative program engine 104 may predict a data correctness confidence value associated with the at least one external data aggregator. In some embodiments, the data correctness confidence value may refer to a calculated value associated with each external data aggregator based on a utilization of a trained crowd sourcing algorithm on social media platform data associated with the plurality of users. In some embodiments, the illustrative program engine 104 may predict the trigger associated with the presence of the at least one data record to predict a predetermined period of time associated with a subsequent update of the database of known queries based on receiving the subsequent input data.

In step 216, the illustrative program engine 104 may be programmed to instruct at least one GUI having at least one programmable GUI element within the computing device 102 to initiate a verification of the presence of the at least one data record. In some embodiments, the illustrative program engine 104 may initiate the verification of the presence of the at least one data record based on the plurality of indicative markers. In some embodiments, the verification of the presence of the at least one data record may refer to a unique identifier associated with at least one user of the plurality of user verification. In some embodiments, the verification of the presence of the at least one data record may refer to a phone call with at least one agent of the call center verification. In some embodiments, the verification of the presence of the at least one data record may refer to a login portal verification. In some embodiments, the illustrative program engine 104 may be programmed to automatically restore the data record within the generated database of known queries in response to a successful verification associated with the data point. In some embodiments, the illustrative program engine 104 may automatically restore the data record within the generated database of known queries based on the plurality of indicative markers.

Figure 3:
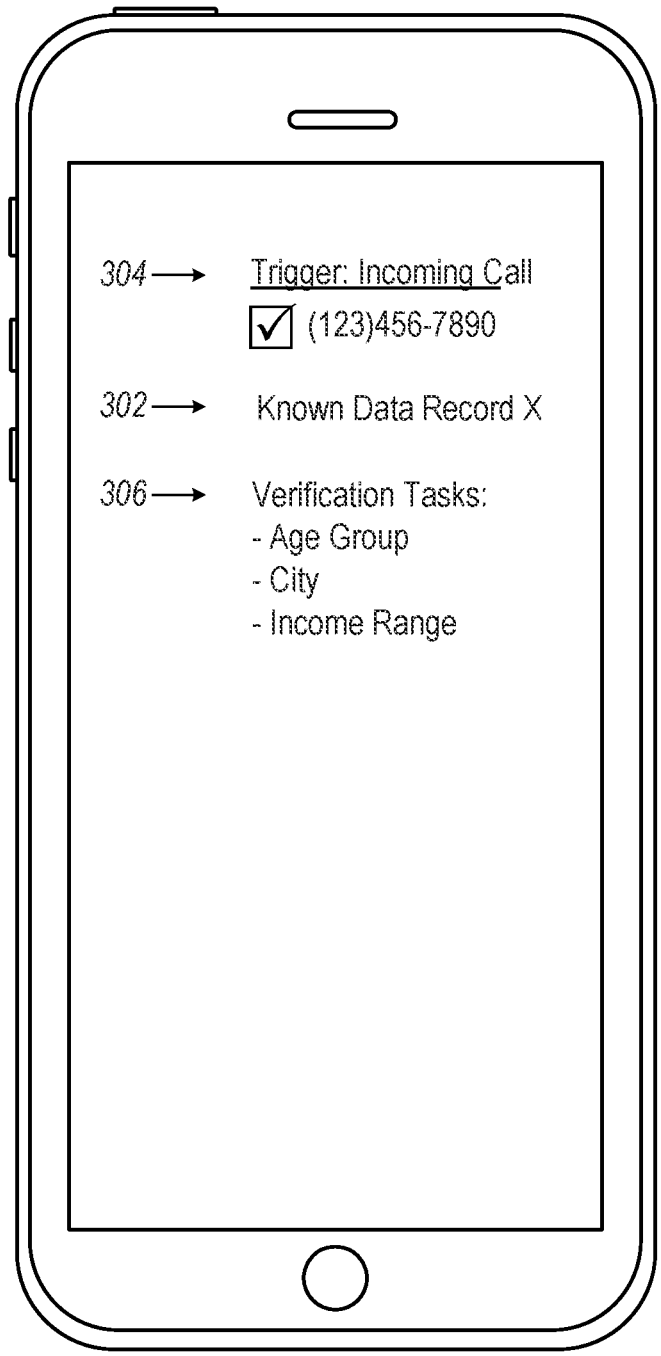
FIG. 3 depicts an initiation of a verification of the presence of the data record based on a plurality of indicative markers as a display on a computing device, in accordance with one or more embodiments of the present disclosure.

FIG. 3 depicts an exemplary diagram 300 of an exemplary computer-based system and platform for automatically updating a computing device 102 associated with a user to initiate a verification of the present of at least one data record including at least one shared data point, in accordance with at least one embodiment.

In some embodiments, the exemplary date record update module 118 may determine a presence of at least one data record within the database of known queries as a known data record 302. In some embodiments, the exemplary date record update module 118 may utilize the trained machine learning module 120 to determine the presence of the at least one data record with the database of known queries as the known data record 302 based on a utilization of a crossrefence algorithm engine 126 when the known data record 302 shares at least one data point between the input data and subsequent input data. In some embodiments, the exemplary date record update module 118 may predict a trigger 304 associated with the known data record 302 that may refer to a frequency of the known data record 302 being shared by a different user of the plurality of users. In some embodiments, the exemplary date record update module 118 may predict the trigger 304 associated with the known data record 302 to predict a predetermined period of time associated with a subsequent update of the database of known queries based on receiving the subsequent input data. In some embodiments, the exemplary date record update module 118 may initiate a verification 306 of the presence of the known data record 302 including the at least one shared data point based on a utilization of the indicative marker engine 124. In some embodiment, the exemplary date record update module 118 may instruct the verification 306 be displayed via at least one GUI programmable element on the computing device 102. In some embodiments, the at least one initiation of verification 306 may refer to a unique identifier associated with at least one user of the plurality of user verification, a call with at least one agent of a call center verification, and/or a login portal verification.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11 ™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

Figure 4:
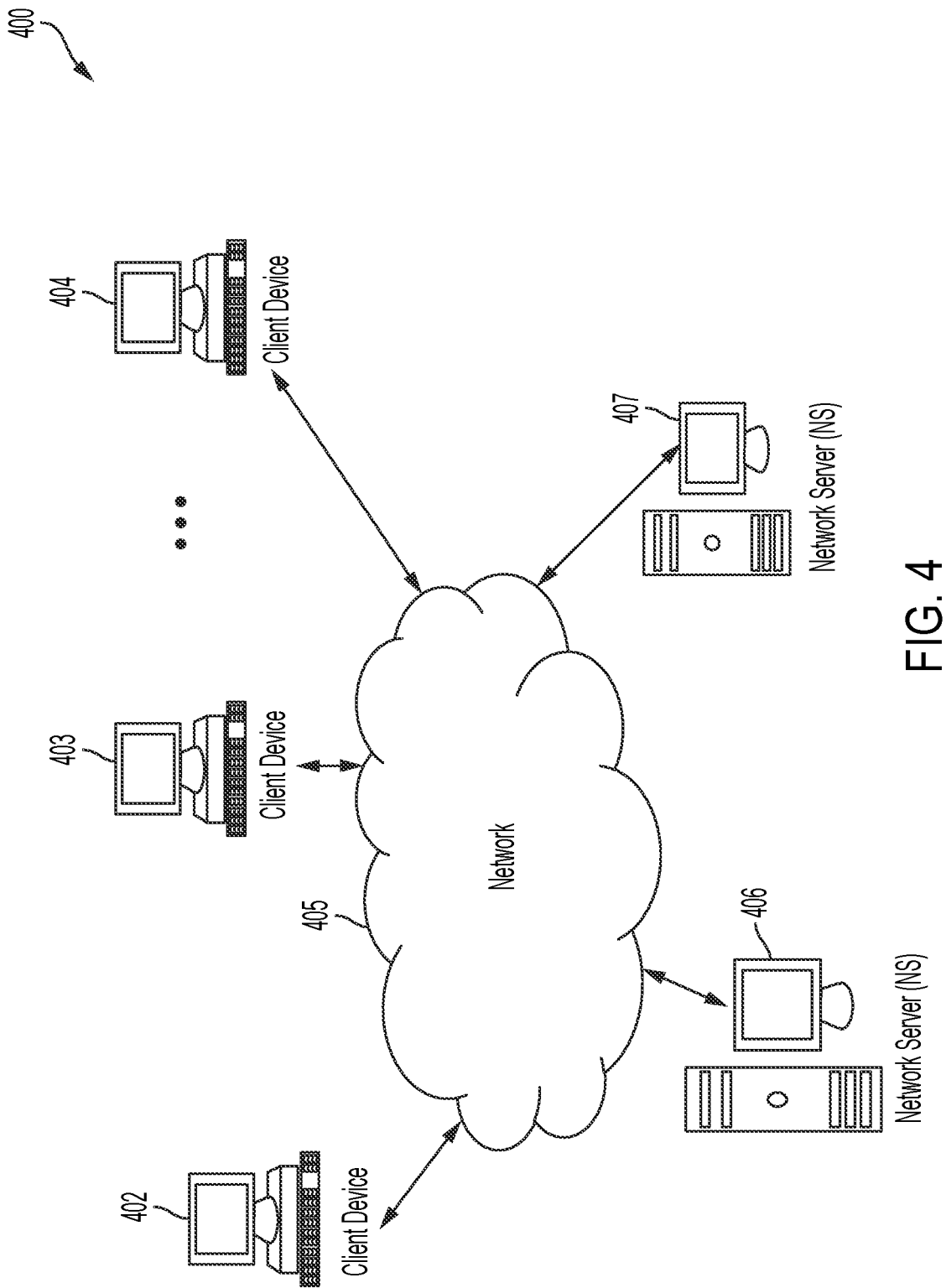
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically update at least one data record including at least one shared data point within a generated database of known queries based on a plurality of indicative markers and displayed via a computing device 102, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary data record update module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of automatically updating, dynamically removing, and automatically restoring a plurality of data records within a generated database of known queries via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary data record update module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to calculate a correctness confidence value and modify the generated database of known queries based on the automatic updates of the exemplary data record update module 118.

Figure 5:
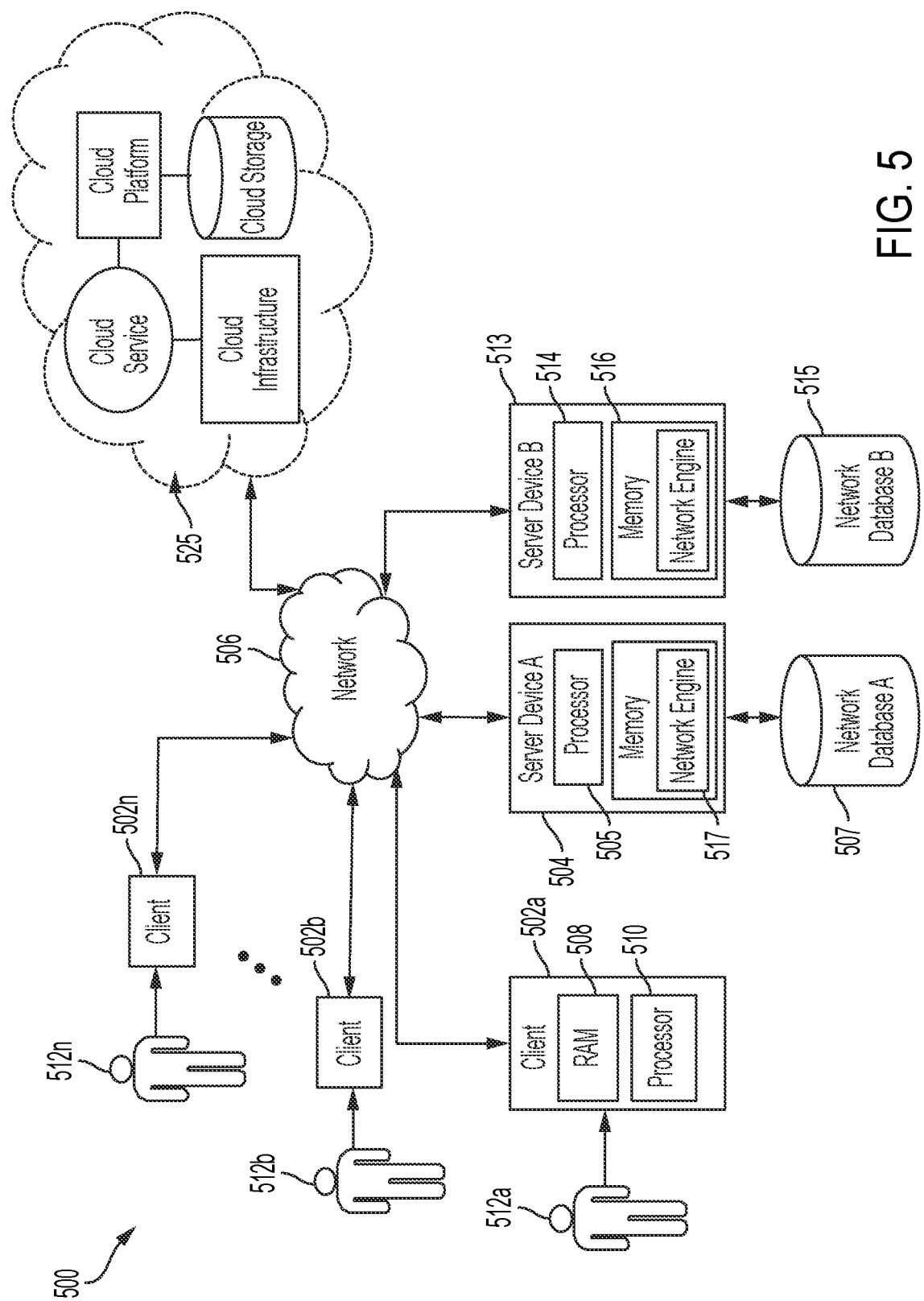
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
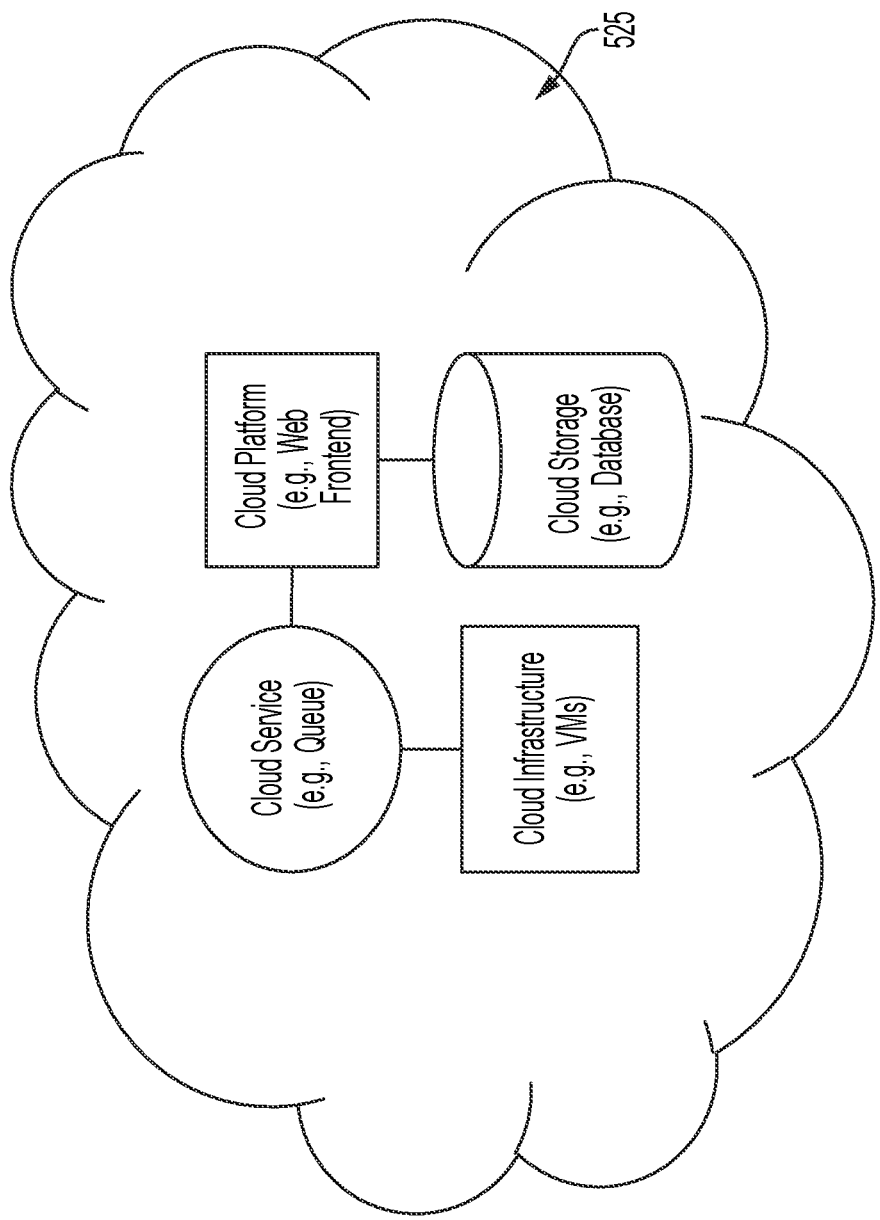
FIGS. 6 and 7 are diagrams illustrating implementations of cloud computing architecture/aspects with respect to which the disclosed technology may be specifically configured to operate, in accordance with one or more embodiments of the present disclosure.
Figure 7:
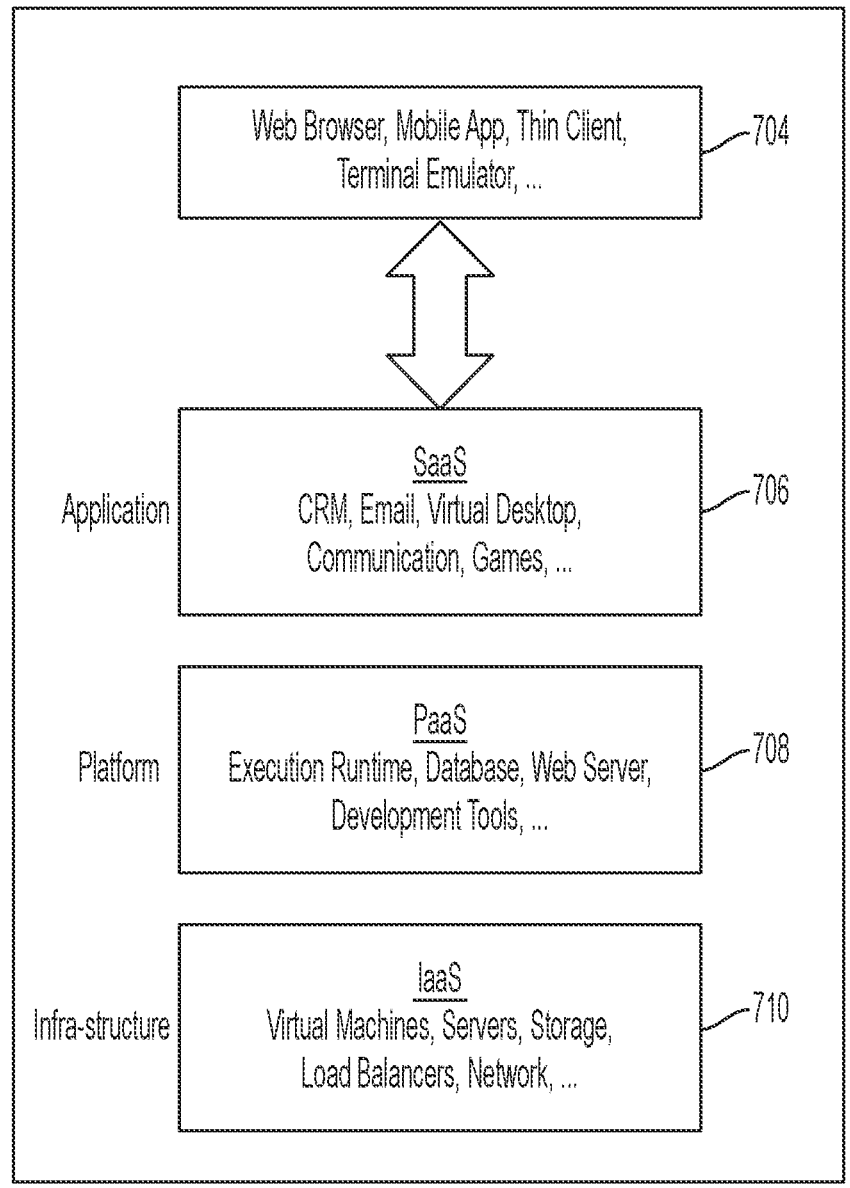

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7, illustrates the exemplary inventive computer-based components of the present disclosure may be specifically configured to operate in the cloud computing/architecture 525 as a source database 704, where the source database 704 may be a web browser, a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
   receiving, by at least one processor, input data from at least one external data aggregator at a predetermined interval of time associated with a collection of input data, where the input data is telecommunication data;
   utilizing, by the at least one processor, at least one trained machine learning algorithm to generate a database of known queries associated with a plurality of users based on an analysis of the input data received from the at least one external data aggregator, where the analysis of the input data provides additional information associated with a plurality of indicative markers;

receiving, by the at least one processor, subsequent input data from the at least one external aggregator at a later interval of time;

automatically updating, by the at least one processor, the database of known queries associated with the plurality of users based on the subsequent input data;

utilizing, by the at least one processor, the at least one trained machine learning algorithm to perform a cross-reference analysis to determine a presence of at least one data record within the database of known queries, where the at least one data record is at least one data point shared between the input data and the subsequent input data;

dynamically removing, by the at least one processor, the at least one data record from the database of known queries based on the cross-reference analysis;

utilizing, by the at least one processor, the trained machine learning algorithm to predict a trigger associated with the presence of the at least one data record including the at least one data point, where the at least one trigger is a data correctness confidence value associated with the at least one external data aggregator; and instructing, by at least one processor, at least one graphic user interface (GUI) having at least one programmable GUI element within a computing device to initiate a verification of the presence of the at least one data record, including the at least one data point, based on the plurality of indicative markers.

2. The method according to clause 1, where the additional information includes ownership rights associated with at least one user of the plurality of users.

3. The method according to clause 1 or 2, where at least one indicative marker of the plurality of indicative markers includes a session interaction protocol certificate associated with at least one user of the plurality of users.

4. The method according to clause 1, 2 or 3, where the database on known queries includes a structured query language database.

5. The method according to clause 1, 2, 3 or 4, where the data record includes a phone number associated with at least one user of the plurality of users.

6. The method according to clause 1, 2, 3, 4 or 5, where the trigger includes a frequency associated with a rotation of the plurality of indicative markers to at least one different user of the plurality of users.

7. The method according to clause 1, 2, 3, 4, 5 or 6, further including predicting the trigger associated with the presence of the at least one data record to predict a predetermined period of time associated with a subsequent update of the database of known queries based on receiving the subsequent input data.

8. The method according to clause 1, 2, 3, 4, 5, 6 or 7, where the at least one external data aggregator includes a third-party data aggregator associated with collecting telecommunication data.

9. The method according to clause 1, 2, 3, 4, 5, 6, 7 or 8, where the data correctness confidence value includes a calculated value associated with each external data aggregator based on a utilization of a trained crowd sourcing algorithm on social media platform data associated with the plurality of users.

10. The method according to clause 1, 2, 3, 4, 5, 6, 7, 8 or 9, where the verification of the presence of the data record comprises, at least one of the following:
a unique identifier associated with at least one user of the plurality of user verification,
a call with at least one agent of a call center verification, and
a login portal verification.

11. The method according to clause 1, 2, 3, 4, 5, 6, 7, 8, 9 or 10, further including automatically restoring the data record within the generated database of known queries in response to a successful verification associated with the data point based on the plurality of indicative markers.

12. A method may include:
receiving, by at least one processor, input data from at least one external data aggregator at a predetermined interval of time associated with a collection of input data, where the input data is telecommunication data;

utilizing, by the at least one processor, at least one trained machine learning algorithm to generate a database of known queries associated with a plurality of users based on an analysis of the input data received from the at least one external data aggregator, where the analysis of the input data provides additional information associated with a plurality of indicative markers;

receiving, by the at least one processor, subsequent input data from the at least one external aggregator at a later interval of time;

automatically updating, by the at least one processor, the database of known queries associated with the plurality of users based on the subsequent input data;

utilizing, by the at least one processor, the at least one trained machine learning algorithm to perform a cross-reference analysis to determine a presence of at least one data record within the database of known queries, where the at least one data record is at least one data point shared between the input data and the subsequent input data;

dynamically removing, by the at least one processor, the at least one data record from the database of known queries based on the cross-reference analysis;

utilizing, by the at least one processor, the trained machine learning algorithm to predict a trigger associated with the presence of the at least one data record including the at least one data point, where the at least one trigger is a data correctness confidence value associated with the at least one external data aggregator;

instructing, by at least one processor, at least one graphic user interface (GUI) having at least one programmable GUI element within a computing device to initiate a verification of the presence of the at least one data record, including the at least one data point, based on the plurality of indicative markers; and automatically restoring the data record within the generated database of known queries in response to a successful verification associated with the data point based on the plurality of indicative markers.

13. The method according to clause 12, where at least one indicative marker of the plurality of indicative markers includes a session interaction protocol certificate associated with at least one user of the plurality of users.

14. The method according to clause 12 or 13, where the database on known queries includes a structured query language database.
15. The method according to clause 12, 13 or 14, where the data record includes a phone number associated with at least one user of the plurality of users.
16. The method according to clause 12, 13, 14 or 15, where the trigger includes a frequency associated with a rotation of the plurality of indicative markers to at least one different user of the plurality of users.
17. The method according to clause 12, 13, 14, 15 or 16, further including predicting the trigger associated with the presence of the at least one data record to predict a predetermined period of time associated with a subsequent update of the database of known queries based on receiving the subsequent input data.
18. A system may include:
   a non-transient computer memory, storing software instructions;
   at least one processor of a first computing device associated with a user;
   wherein, when the at least one processor executes the software instructions, the first computing device is programmed to:
      receive, by at least one processor, input data from at least one external data aggregator at a predetermined interval of time associated with a collection of input data, where the input data is telecommunication data;
      utilize, by the at least one processor, at least one trained machine learning algorithm to generate a database of known queries associated with a plurality of users based on an analysis of the input data received from the at least one external data aggregator, where the analysis of the input data provides additional information associated with a plurality of indicative markers;
      receive, by the at least one processor, subsequent input data from the at least one external aggregator at a later interval of time;
      automatically update, by the at least one processor, the database of known queries associated with the plurality of users based on the subsequent input data;
      utilize, by the at least one processor, the at least one trained machine learning algorithm to perform a cross-reference analysis to determine a presence of at least one data record within the database of known queries, where the at least one data record is at least one data point shared between the input data and the subsequent input data;
      dynamically remove, by the at least one processor, the at least one data record from the database of known queries based on the cross-reference analysis;
      utilize, by the at least one processor, the trained machine learning algorithm to predict a trigger associated with the presence of the at least one data record including the at least one data point, where the at least one trigger is a data correctness confidence value associated with the at least one external data aggregator; and
      instruct, by at least one processor, at least one graphic user interface (GUI) having at least one programmable GUI element within a computing device to initiate a verification of the presence of the at least one data record, including the at least one data point, based on the plurality of indicative markers.
19. The system according to clause 18, where the software instructions further include predicting the trigger associated with the presence of the at least one data record to predict a predetermined period of time associated with a subsequent update of the database of known queries based on receiving the subsequent input data.
20. The system according to clause 18 or 19, where the software instructions further include automatically restoring the data record within the generated database of known queries in response to a successful verification associated with the data point based on the plurality of indicative markers.

What is claimed is:
1. A method, comprising:
   receiving, by at least one processor, input data from at least one external aggregator at predefined time intervals;
   automatically updating, by the at least one processor, a database of known queries associated with a plurality of users based on the input data received at the predefined time intervals;
   automatically inputting, by the at least one processor, the input data at the predefined time intervals into at least one machine learning algorithm that is trained to:
      automatically perform a cross-reference analysis between a plurality of data records stored in the database of known queries to determine when at least two data records from the plurality of data records, respectively associated with at least two users from the plurality of users, share at least one user-specific indicative marker, and
      automatically output, based on a positive determination that the at least two data records share the at least one user-specific indicative marker, a user verification trigger; and
   automatically performing, by the at least one processor, in response to the user verification trigger:
      a user verification to determine at least one verified user and at least one unverified user from the at least two users that are associated with the at least one user-specific indicative marker,
      a removal of at least one data record from the at least two data records, associated with the at least one unverified user, from the database of known queries, and
      automatically updating a call-screen graphical user interface (GUI) of a telecommunications endpoint device in real time to present a verified caller identity when the user verification determines the at least one verified user, and suppress a presentation of an incoming call associated with the at least one unverified user.
2. The method according to claim 1, wherein the database on known queries comprises a structured query language database.
3. The method according to claim 1, wherein the at least one user-specific indicative marker comprises a STIR/SHAKEN certificate, an IP address, a user device unique identifier, a user device passcode, a user device mobile station integrated services digital network (MSISDN) number, or any combination thereof.
4. The method according to claim 1, wherein the performing of the user verification to determine the at least one verified user comprises determining ownership rights of the at least one verified user of the at least one user-specific indicative marker.

5. The method according to claim 1, wherein the at least one external aggregator is at least one third party data aggregator collecting the input data associated with at least one type of data comprising telecommunication data, audio data, visual data, digital data, usage data, or any combination thereof.

6. The method according to claim 1, wherein the performing of the user verification comprises instructing at least one graphic user interface (GUI) having at least one programmable GUI element within a computing device to initiate the user verification.

7. The method according to claim 6, wherein the performing of the user verification to comprises performing by the computing device at least one of:
an entering of a unique identifier into the at least one GUI,
a call with at least one agent of a call center, or
a login portal verification.

8. The method according to claim 1, further comprising utilizing, by the at least one processor, the at least one machine learning algorithm to output a data correctness confidence value associated with the at least one external aggregator to predict a likelihood of a modification in ownership of the at least one user-specific indicative marker.

9. The method according to claim 8, wherein the data correctness confidence value is a calculated value associated with each of the at least one external aggregator based on a utilization of a trained crowd sourcing algorithm of social media platform data associated with the plurality of users.

10. The method according to claim 1, further comprising utilizing, by the at least one processor, the at least one machine learning algorithm to generate the database of known queries based on an analysis of the input data.

11. A system, comprising:
at least one transitory memory storing computer code; and
at least one processor;
wherein the at least one processor is configured to execute the computer code that causes the at least one processor to:
receive input data from at least one external aggregator at predefined time intervals;
automatically update a database of known queries associated with a plurality of users based on the input data received at the predefined time intervals;
automatically input the input data at the predefined time intervals into at least one machine learning algorithm that is trained to:
automatically perform a cross-reference analysis between a plurality of data records stored in the database of known queries, to determine when at least two data records from the plurality of data records, respectively associated with at least two users from the plurality of users, share at least one user-specific indicative marker, and
automatically output, based on a positive determination that the at least two data records share the at least one user-specific indicative marker, a user verification trigger; and
automatically perform in response to the user verification trigger:
a user verification to determine at least one verified user and at least one unverified user from the at least two users that are associated with the at least one user-specific indicative marker,
a removal of at least one data record from the at least two data records associated with the at least one unverified user, from the database of known queries, and
automatically updating a call-screen graphical user interface (GUI) of a telecommunications endpoint device in real time to present a verified caller identity when the user verification determines the at least one verified user, and suppress a presentation of an incoming call associated with the at least one unverified user.

12. The system according to claim 11, wherein the database on known queries comprises a structured query language database.

13. The system according to claim 11, wherein the at least one user-specific indicative marker comprises a STIR/SHAKEN certificate, an IP address, a user device unique identifier, a user device passcode, a user device mobile station integrated services digital network (MSISDN) number, or any combination thereof.

14. The system according to claim 11, wherein the at least one processor is configured to perform the user verification to determine the at least one verified user by determining ownership rights of the at least one verified user of the at least one user-specific indicative marker.

15. The system according to claim 11, wherein the at least one external aggregator is at least one third party data aggregator collecting the input data associated with at least one type of data comprising telecommunication data, audio data, visual data, digital data, usage data, or any combination thereof.

16. The system according to claim 11, wherein the at least one processor is configured to perform the user verification by instructing at least one graphic user interface (GUI) having at least one programmable GUI element within a computing device to initiate the user verification.

17. The system according to claim 16, wherein the at least one processor is configured to perform the user verification by the computing device performing at least one of:
an entering of a unique identifier into the at least one GUI,
a call with at least one agent of a call center, or
a login portal verification.

18. The system according to claim 11, wherein the at least one processor is further configured to utilize the at least one machine learning algorithm to output a data correctness confidence value associated with the at least one external aggregator to predict a likelihood of a modification in ownership of the at least one user-specific indicative marker.

19. The system according to claim 18, wherein the data correctness confidence value is a calculated value associated with each of the at least one external aggregator based on a utilization of a trained crowd sourcing algorithm of social media platform data associated with the plurality of users.

20. The system according to claim 11, wherein the at least one processor is further configured to utilize the at least one machine learning algorithm to generate the database of known queries based on an analysis of the input data.

21. A method, comprising:
a means for receiving input data from at least one external aggregator at predefined time intervals;
a means for automatically updating a database of known queries associated with a plurality of users based on the input data received at the predefined time intervals;
a means for automatically performing a cross-reference analysis between a plurality of data records, to determine when at least two data records from the plurality of data records, respectively associated with at least two users from the plurality of users, share at least one user-specific indicative marker;

a means for automatically outputting, based on a positive determination that the at least two data records share the at least one user-specific indicative marker, a user verification trigger; and a means for automatically performing in response to the user verification trigger:

a user verification to determine at least one verified user and at least one unverified user from the at least two users that are associated with the at least one user-specific indicative marker, a removal of at least one data record from the at least two data records associated with the at least one unverified user, from the database of known queries, and automatically updating a call-screen graphical user interface (GUI) of a telecommunications endpoint device in real time to present a verified caller identity when the user verification determines the at least one verified user, and suppress a presentation of an incoming call associated with the at least one unverified user.

* * * * *